US008947768B2

(12) United States Patent
Kliner et al.

(10) Patent No.: US 8,947,768 B2
(45) Date of Patent: Feb. 3, 2015

(54) MASTER OSCILLATOR—POWER AMPLIFIER SYSTEMS

(71) Applicant: JDS Uniphase Corporation, Milpitas, CA (US)

(72) Inventors: Dahv Kliner, Portland, OR (US); Martin H. Muendel, Oakland, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/893,120

(22) Filed: May 13, 2013

(65) Prior Publication Data

US 2013/0301116 A1   Nov. 14, 2013

Related U.S. Application Data

(60) Provisional application No. 61/646,665, filed on May 14, 2012.

(51) Int. Cl.
*H01S 3/23* (2006.01)
*H01S 3/067* (2006.01)
*G02B 6/02* (2006.01)
*H01S 3/094* (2006.01)

(52) U.S. Cl.
CPC .......... *H01S 3/2308* (2013.01); *G02B 6/02371* (2013.01); *H01S 3/06754* (2013.01); *H01S 3/06733* (2013.01); *H01S 3/06758* (2013.01); *H01S 3/094007* (2013.01)
USPC .......................................... 359/341.1; 372/6

(58) Field of Classification Search
CPC ..................... H01S 3/2308; G02B 6/02371
See application file for complete search history.

(56) References Cited

U.S. PATENT DOCUMENTS

| | | | |
|---|---|---|---|
| 4,074,203 A * | 2/1978 | Hughes | 359/337 |
| 5,473,622 A | 12/1995 | Grubb | 372/6 |
| 5,530,709 A | 6/1996 | Waarts et al. | 372/6 |
| 5,881,197 A | 3/1999 | Dong et al. | 385/127 |
| 6,125,132 A * | 9/2000 | Okazaki | 372/75 |
| 6,275,632 B1 * | 8/2001 | Waarts et al. | 385/37 |
| 6,288,835 B1 | 9/2001 | Nilsson et al. | 359/341.3 |
| 7,280,567 B2 | 10/2007 | Luo et al. | 372/6 |
| 7,349,452 B2 * | 3/2008 | Brennan et al. | 372/25 |
| 7,421,175 B2 | 9/2008 | Varnham | 385/126 |
| 7,649,914 B2 | 1/2010 | Lewis | 372/6 |
| 7,787,729 B2 * | 8/2010 | Dong et al. | 385/123 |
| 7,839,902 B2 | 11/2010 | Li et al. | 372/6 |
| 7,912,099 B2 | 3/2011 | Gapontsev et al. | 372/6 |
| 8,498,046 B2 * | 7/2013 | Dong et al. | 359/341.5 |
| 2006/0263024 A1 * | 11/2006 | Dong et al. | 385/125 |
| 2008/0112666 A1 * | 5/2008 | Clarkson et al. | 385/22 |
| 2011/0249319 A1 * | 10/2011 | Savage-Leuchs | 359/341.1 |
| 2011/0249692 A1 * | 10/2011 | Honea et al. | 372/29.011 |

\* cited by examiner

*Primary Examiner* — Ari M Diacou
(74) *Attorney, Agent, or Firm* — JDS Uniphase Corporation

(57) ABSTRACT

The invention provides fiber-optic light sources such as cladding-pumped master oscillator—power amplifier (MOPA) systems which use double-clad optical fibers (DCF). The inner cladding of the first DCF used in the master oscillator section has a circular cross-section in order to enable the formation of low loss optical splices in the integrated MOPA structure. The inner cladding of the second DCF in the output amplifier section has a shaped non-circular cross-section in order to enhance the absorption of the pump light in the doped core of the second DCF.

7 Claims, 4 Drawing Sheets

MASTER OSCILLATOR—POWER AMPLIFIER SYSTEMS

CROSS-REFERENCE TO RELATED APPLICATIONS

The present invention claims priority from U.S. Provisional Patent Application No. 61/646,665 filed May 14, 2012 which is incorporated herein by reference.

TECHNICAL FIELD

The present invention generally relates to fiber-optic light sources, and more particularly relates to master oscillator/power amplifier (MOPA) systems having circular cross-section of the inner cladding of the master oscillator double-clad optical fiber.

BACKGROUND OF THE INVENTION

Fiber-optic light sources using optical fibers doped with rare-earth ions such as erbium (Er) and ytterbium (Yb) are used in a variety of applications such as material processing, telecommunications, spectroscopy, medicine, etc. In a configuration commonly referred to as MOPA (Master Oscillator/Power Amplifier), a relatively low-power fiber laser with a desired spectral and temporal properties is used to seed one or more subsequent fiber-optic amplification stages, which boost the power to a desired level. Characteristics of such fiber sources strongly depend on the design of optical fibers used in each stage, which are often optimized for a particular application or range of applications.

An optical fiber has a core, typically 5-100 micron (μm) in diameter, which guides light, and a cladding, typically 125-600 μm in diameter, which surrounds the core; the core has a higher refractive index than the cladding. The cladding is typically composed of fused silica, and the core typically includes dopants to raise the index relative to the cladding. These dopants can also impart other functionality to the core; in particular, inclusion of one or more rare-earth dopants enables the core to exhibit gain when optically pumped, typically using diode lasers, enabling fabrication of fiber lasers and amplifiers. For low-power fiber sources, for example having output power less than approximately 0.5 W, the pump light can be launched into the core because suitable pump diodes are available. For higher-power fiber sources, pump diodes with sufficient brightness to efficiently launch into the core are not available. Instead, the fiber cladding is surrounded by a lower-index material, typically a polymer or fluorosilicate glass, so that it also guides light. In this "double-clad fiber" (DCF) structure, the pump light is launched into the cladding, which is for DCFs is typically referred to as the "inner cladding" or "pump core", but it is absorbed only in the core, retaining the benefits of a confined gain region. The advent of DCF has enabled power scaling of fiber sources to kW levels because high pump power can be launched into the relatively large area of the inner cladding.

Most fibers have a circular cladding shape, which is easiest to manufacture. In a rare-earth-doped DCF with a circular cladding, however, the pump absorption is observed to be relatively low because of the presence of "helical modes," which propagate in a corkscrew-shaped pattern without intersecting the core and are thus not absorbed. In fact, in the absence of a mechanism to eliminate or scramble helical modes, a fraction of the pump light will not be absorbed even for extremely long fiber lengths, resulting in low system efficiency. Most DCFs therefore employ one or more mechanisms for scrambling helical modes. The most common approach is to use a shaped inner cladding; the most common shapes currently are octagonal and hexagonal, although many other shapes have been reported, including square, rectangular, D-shaped, and clover-shaped. Another approach is to route the fiber in a non-circular path, such as a figure-eight, but this method limits packaging options and entails other compromises. In polarization-maintaining (PM) and "holey" fibers, internal structures within the inner cladding effectively scramble helical modes, and the fiber cladding can thus be circular (although it doesn't have to be); most fiber sources, however, do not employ PM or holey fiber.

The MOPA system may employ the same gain fiber in both the laser/master oscillator (MO) and the power amplifier (PA) sections of the system, or may employ different fibers for the PA and MO sections. All published designs, to the knowledge of the inventors, employ some means to scramble helical modes in both the oscillator and amplifier fiber(s). In particular, most prior art designs employ shaped fibers in both the oscillator and amplifier(s), whether the core designs are the same or different in the oscillator and amplifier stages.

DCFs with shaped inner claddings, however, have certain practical disadvantages in comparison with more conventional circular-cladding fibers. Firstly, the shaped-cladding fiber is more expensive because of the additional processing steps involved in fabricating the shaped preform used to draw the fiber. Next, manufacturing tolerances are typically larger for shaped-cladding fibers. Specifically, higher variability exists in the cladding diameter and shape and in the core concentricity. These increased tolerances result in larger variability, both within a fiber run and lot-to-lot, in the pump loss when splicing to other fibers with matched cladding area, and in the pump absorption coefficient, which determines the optimum fiber length and/or the output power. Furthermore, stripping, cleaving, and splicing of shaped fibers has lower yield and is less reproducible, increasing manufacturing times and scrap because of required rework. Ultimately, higher pump and/or signal splice loss may be required to obtain acceptable yields or cycle times, resulting in lower system efficiency and problems associated with thermal management of the optical power lost in the splices, which is typically converted to heat.

Thus, there is a need for an improved cladding-pumped MOPA structure which addresses at least some of the aforementioned shortcomings.

SUMMARY OF THE INVENTION

Accordingly, the present invention relates to an integrated master oscillator and power amplifier (MOPA) system comprising: a) a fiber laser oscillator for emitting laser light when pumped by pump light and comprising a first double clad optical fiber (DCF) having a core doped with active ions along at least a portion thereof, an inner cladding surrounding the core and defining a waveguide for the laser light generated in the core, and an outer cladding surrounding the inner cladding and defining a waveguide for the pump light, the fiber laser oscillator further including first and second fiber Bragg grating (FBG) reflectors integrally disposed at opposite ends of the first DCF so as to define an optical cavity of the fiber laser oscillator; b) a pump source optically coupled to the first DCF for emitting the pump light into the inner cladding of the first DCF; and, c) a first fiber optic power amplifier comprising a second double clad optical fiber having a core doped with active ions for amplifying the laser light received from the fiber laser oscillator through the second FBG reflector, an inner cladding for guiding the laser radiation, and an outer cladding for guiding the pump radiation received from the fiber laser oscillator through the second FBG reflector. The fiber laser oscillator is optically coupled to the first fiber optic amplifier using one or more optical splices so as to form a monolithic fiber-optic structure. The inner cladding of the first DCF has a circular cross-section in order to enable the formation of low loss optical splices in the integrated MOPA structure, while the inner cladding of the second double clad optical fiber has a shaped non-circular cross-section in order to enhance the absorption of the pump light in the doped core of the second DCF.

Another aspect of the present invention relates to an integrated MOPA system comprising a fiber laser oscillator comprising two fiber Bragg grating (FBG) reflectors spliced at opposite ends of a section of an amplifying optical fiber, an output power amplifier, and one or more intermediate fiber amplifiers sequentially coupled in-between the fiber laser oscillator and the output power amplifier using fiber-optic splices in the absence of mode mixers therebetween to form an integral fiber-optic structure, wherein each section of the MOPA system, including the fiber laser oscillator, the output amplifier and the one or more intermediate fiber amplifiers, is formed of a double-clad optical fiber (DCF) having a core, an inner cladding, and an outer cladding; and, wherein the inner cladding of the DCF has a circular cross-section in all sections of the MOPA system except for the output power amplifier where the inner cladding of the DCF has a shaped non-circular cross-section, in order to enhance the absorption of the pump light in a doped core of the output power amplifier while enabling the formation of low loss optical splices in the rest of the MOPA system.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular optical designs, optical components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Note that as used herein, the terms "first", "second" and so forth are not intended to imply sequential ordering, but rather are intended to distinguish one element from another unless explicitly stated. The term "double-clad optical fiber", abbreviated as "DCF", is used in this specification to refer to an optical fiber which has at least two waveguiding regions, one overlapping the other. "DCF" is understood to include triple-clad structures and even higher-order multi-clad structures including graded-index clad structures.

Figure 1:
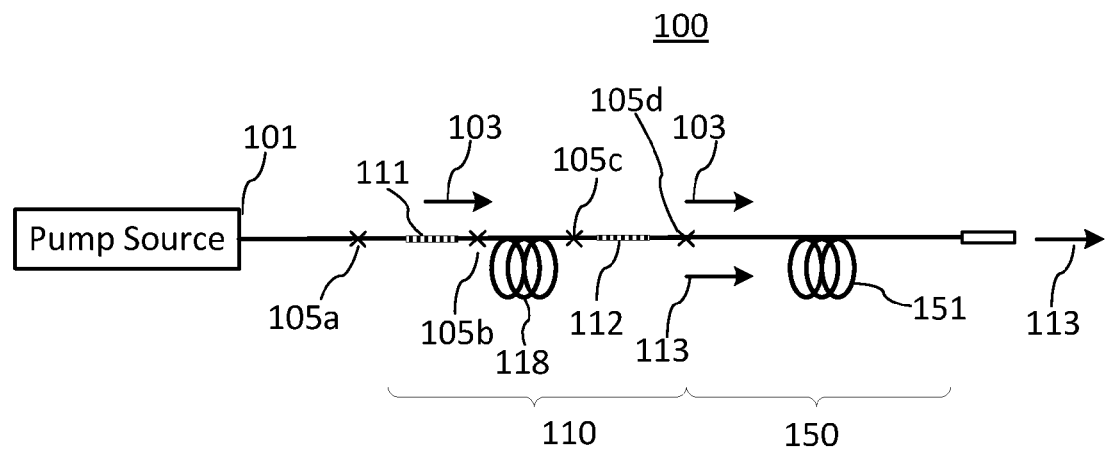
FIG. 1 is a schematic diagram of an integrated all-fiber MOPA system with a single power amplifier stage.
Figure 2:
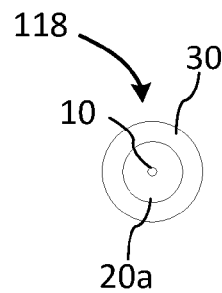
FIG. 2 is a diagram illustrating a cross-section of a double-clad fiber in the master oscillator section of a MOPA, which has a round inner cladding.
Figure 3:
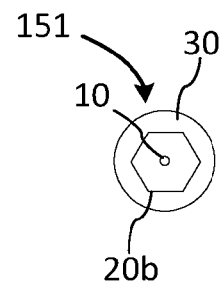
FIG. 3 is a diagram illustrating a cross-section of a double-clad fiber in the output power amplifier section of a MOPA, which has a shaped non-circular inner cladding.

With reference to FIGS. 1-3, there is illustrated an exemplary integrated fiber MOPA system 100 which includes a pump source 101, such as a laser diode, followed by a master oscillator (MO) 110 in the form of a fiber laser, which is in turn followed by an output power amplifier (PA) 150, which is also referred to herein as the first fiber optic power amplifier. In a fiber-based MOPA system such as the MOPA 100, it is desirable for the system to be a monolithic, fused-fiber structure with no free-space beams, i.e., for the optical fibers which embody the different stages of the MOPA 100 to be spliced together. These fiber splices are schematically indicated in FIG. 1 with crosses 105a, 105b, 105c, and 105d, and are generally referred to as splices 105.

The master oscillator 110 is formed of a first DCF 118 and first and second fiber Bragg grating (FBG) reflectors 111, 112, which are integrally disposed at opposite ends of the first DCF 118 so as to define a fiber-optic cavity of the master oscillator 110. In one embodiment, the first DCF 118, which is also referred to herein as a laser fiber 118, is spliced to the two fiber Bragg grating (FBG) reflectors 111, 112 that define the laser cavity. The first FBG 111 is a high reflector (HR) for the laser light 113 that is generated in the core 10 of the fiber 118 when the MO 110 is pumped by the pump light 103. The second FBG 112 is a partial reflector for the laser light 113, with a typical reflectivity of 5-50%, and serves as the output coupler (OC) for the laser light 113. The reflectivity of the HR 111 to the laser light 113 may, for example, be in the range from 95% to over 99%. The output laser light 113 of the oscillator 110 is launched into the fiber amplifier 150 by splicing the output end of the output coupler/FBG 112 to a proximal end of the amplifier fiber 151 or to an intermediate fiber (not shown) that is spliced to the amplifier fiber 151. Both the laser fiber 118 and the amplifier fiber 151 are double-clad optical fibers (DCF) having an 'active' core 10, an inner cladding 20a or 20b surrounding the core and defining a waveguide for the laser light 113 generated in the core of the laser fiber 118, and an outer cladding 30 surrounding the inner cladding 20 and defining a waveguide for the pump light 103, as illustrated in FIGS. 2 and 3, respectively. The laser fiber 118 is also referred to herein as the oscillator fiber. The amplifier fiber 151 is also referred to herein as the second DCF. The inner core of the fibers 118, 151 is doped with rear-earth elements such as erbium (Er), ytterbium (Yb), neodymium (Nd), dysprosium (Dy), praseodymium (Pr), or thulium (Tm), along at least a portion of the length of the fiber so as to provide optical gain for the laser light 103 when pumped by the pump light 103. The FBGs 111, 112 may also be formed in undoped portions of the first DCF 118 so as to permit the propagation of all unabsorbed pump light 103 to the PA 150.

Figure 6:
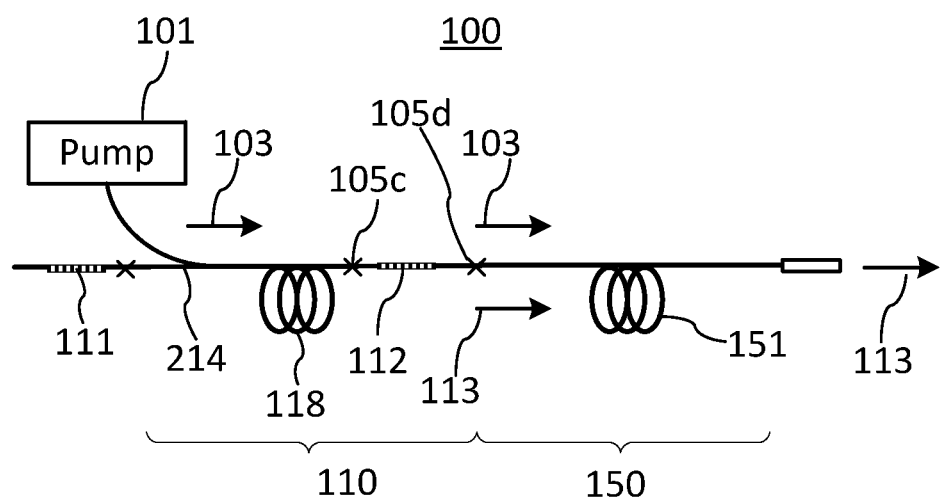
FIG. 6 is a schematic diagram of an integrated all-fiber MOPA system with a pump light propagating through a single FBG.

In operation, pump light 103 is launched at first into the inner cladding 20a of the oscillator fiber 118 and is partially absorbed in the core 10 to generate the laser light 113. After propagating through the laser fiber 118, an unabsorbed portion of the pump light 103 is coupled into the inner cladding 20b of the amplifier fiber 151. In the illustrated embodiment, the pump light 103 propagates from the pump source 101 to the oscillator fiber 118 and thence to the amplifier fiber(s) 151 through both FBGs 111, 112. The pump light 103 experiences very small to negligible reflection from the FBGs 111, 112 both because of the wavelength difference between the pump and laser light and also because of a small overlap of the index grating in the core of the FBGs with most cladding modes. In another embodiment, the pump light 103 may be launched into the laser fiber 118 using a coupler or a fiber-optic beam combiner, such as a directional coupler 214 in FIG. 6, which may be connected to the laser fiber 118 after the HR 111, so that the pump light 103 is launched directly into the laser fiber 118 and does not propagate through the HR 111.

The pump source 101 may be in the form of one or more semiconductor laser diodes having an operating wavelength range matching the absorption band of the active laser dopants, typically from 800 to 1000 nanometers. When the pump source 101 includes two or more laser diodes, their outputs may be combined into a single pump beam 103 using, for example, a fused N×1 fiber-optic combiner as known in the art. For DCF-based MOPA systems in which pump light propagates through the FBG(s), such as MOPA 100, the FBG (s) 111, 112 both employ DCFs; this DCF does not need to be shaped because pump light is only absorbed in the gain fiber (s), not in the passive fibers usually employed to fabricate FBGs. Accordingly, the cross-section of the FBGs 111, 112 may be generally as illustrated in FIG. 2, with a circular inner cladding 20a.

In general, both pump and signal light 103, 113 should propagate through the various fibers and fiber splices in the MOPA 100 with low loss. In the embodiment of FIG. 1, the pump light 103 is launched into a back end of the HR 111 and passes sequentially through the inner claddings of the DCF fiber of HR 111, the oscillator gain fiber 118, the OC 112, and finally of the amplifier fiber 151. Some of the pump power is absorbed in the core of oscillator fiber 118, and most is absorbed in the core of the amplifier fiber 151. The laser light 113 passes through all of the fiber cores and splices of the DCFs that constitute the FBGs 111, 112, MO 110 and PA 150.

Conventional MOPA designs use shaped-cladding gain fibers in both the master oscillator and power amplifier section, with their inner-cladding area being typically matched to the inner cladding area of the passive DCFs used to fabricate the FBGs. Additionally, some prior-art MOPA designs also use a special mode mixing fiber inserted between the master oscillator section and the power amplifier section, as described for example in U.S. Pat. No. 7,649,914. Because of the large manufacturing tolerances on the shaped-cladding fiber, excessive pump splice loss may result in some passive-active splices, such as splices between the FBGs and the master oscillator fiber. Considering by way of example an embodiment of MOPA generally of the type shown in FIG. 1 but with the shaped non-circular cladding gain DCF 118 having the inner-cladding area that is relatively large compared to that of the FBG fibers, there would be low splice loss between the HR 111 and master oscillator 118, but a high splice loss between the master oscillator 118 and the (smaller-fiber) OC 112. This problem could be mitigated by specifying each successive fiber to have larger inner-cladding diameter, but that would require two different passive fibers for the HR 111 and OC 112. One drawback of that approach is an increased MOPA cost; another drawback is that it would reduce the pump absorption in the amplifier fiber 118 due to the larger cross-sectional-area of the inner cladding, thereby further increasing cost and/or decreasing efficiency. Furthermore, shaped fibers with non-circular claddings have poor stripping, cleaving, and splicing properties compared to fibers with circular claddings, also leading to an increase in the signal splice loss, thereby decreasing the MOPA power and efficiency, and to a reduction in the splice yield, thereby increasing manufacturing time and cost.

The inventors of the present invention have found that these problems and drawbacks of the conventional MOPA designs may be eliminated by using a round DCF rather than a shaped DCF as the master oscillator fiber 118, while using a DCF with non-circular inner cladding as the amplifier fiber 151. Note that in the context of this specification the terms 'round fiber', 'circular fiber', and 'circular-cladding fiber' are used interchangeably to refer to a DCF having an inner cladding of substantially circular cross-section. Here the term 'substantially' means that any non-circularity to the inner cladding's cross-section results from manufacturing tolerances in the fiber manufacturing process rather than being deliberately introduced during fiber manufacturing as known in the art, for example by specifically shaping fiber's preform to be non-circular in cross-section. Similarly, the terms 'shaped fiber', 'non-circular fiber', and 'non-circular cladding fiber' and the like are used herein interchangeably to refer to a DCF having an inner cladding of substantially non-circular cross-section. Here the term 'substantially' means that the non-circularity of the inner cladding's cross-section results not from manufacturing tolerances but was deliberately introduced during fiber manufacturing as known in the art, for example by specifically shaping fiber's preform to be non-circular in cross-section.

Turning back to FIGS. 1-3, in accordance with this feature of the present invention the inner cladding 20a of the first DCF 118 has a circular cross-section in order to enable the formation of low loss optical splices in the integrated MOPA structure, while the inner cladding 20b of the second double clad optical fiber 151 has a shaped non-circular cross-section in order to enhance the absorption of the pump light in the doped core of the second DCF. Although the round oscillator fiber 118 has a lower pump absorption coefficient because it supports helical modes, the net system power and efficiency does not suffer because the shaped amplifier fiber 151 scrambles the helical modes filling out the inner cladding's aperture with the pump light 103, redirecting a portion of its power into the doped core 10 of the amplifier fiber 151. The net pump absorption can be kept the same as in the design with a shaped oscillator fiber simply by increasing the length of the oscillator fiber 118, or alternatively the amplifier fiber 151 could be made longer; in any case, only a fraction of the pump power needs to be absorbed in the oscillator fiber 118, so its pump absorption does not have to be high or complete. The MOPA 100 as a whole does not support helical modes because of the shaped amplifier fiber 151, so no pump power is "unabsorbable." By way of example, in one particular embodiment of the MOPA 100 with Yb doped DCFs 118, 151 the length of the round laser fiber 118 was about 4-5 meters and the length of the amplifier fiber 151 was about 20 meters, which constitutes a relatively small increase of only about 1-2 meters in total length of active DCF compared to a similar MOPA with a shaped DCF in both the MO and PA sections, in which case the MO was about 3 meters long and the PA again 20 meters. Of course, other designs of MOPA 100 may utilize different lengths of DCF fibers, depending on a target application, DCF design, dopants used, etc.

Using a round fiber in the master oscillator portion 110 of the MOPA and a non-round fiber in the output amplifier section thereof 150 has significant benefits. The round oscillator fiber 118 can be fabricated with the same tolerances, and optionally to the same specifications, as the passive fiber using in the FBGs 111, 112, thereby significantly improving the splice performance and yield. In particular, all round-shaped splices are eliminated except for the final splice 105d from the OC 112 to the amplifier 150. The HR-to-MO and MO-to-OC splices 105b,c may be easily made with a desired high performance, i.e. low optical loss for both pump and laser light, and high yield associated with "round-round" splices. Although one additional fiber type may be required, i.e. the round oscillator fiber 118 doped with 'active' elements such as Er, it generally has a lower cost than the corresponding shaped fiber such as the amplifier DCF 151. In one embodiment, the inner-cladding cross-section of the amplifier fiber 151 can be larger in area than that of the laser fiber 118 of the fiber of the FBG 112, ensuring low splice loss for the pump light 103 propagating into the amplifier fiber 151, even though the tolerance on the diameter of the shaped amplifier fiber 151 is larger than that of the round fibers. In one embodiment, additional mode mixing means such as a piece of a mode-mixing fiber may be inserted between the master oscillator 110 and the power amplifier 150. We found however that a proper selection of the fiber length of the MO and PA sections 110, 150 ensures a sufficiently full absorption of the pump light 103 in the MOPA, thereby eliminating the need of any additional mode mixing means between the MO and PA sections. Accordingly, in a currently preferred embodiment of the MOPA system, the fiber laser oscillator 110 and the first fiber optic power amplifier 150 are sequentially coupled with fiber splices in the absence of a mode mixer therebetween.

The aforedescribed approach is also applicable to MOPA systems with multiple amplification stages, e.g., in systems with components or changes in core design between different stages of the MOPA. In such systems, all fibers may have a circular inner cladding except for a final amplifier fiber at the output of the MOPA.

Figure 4:
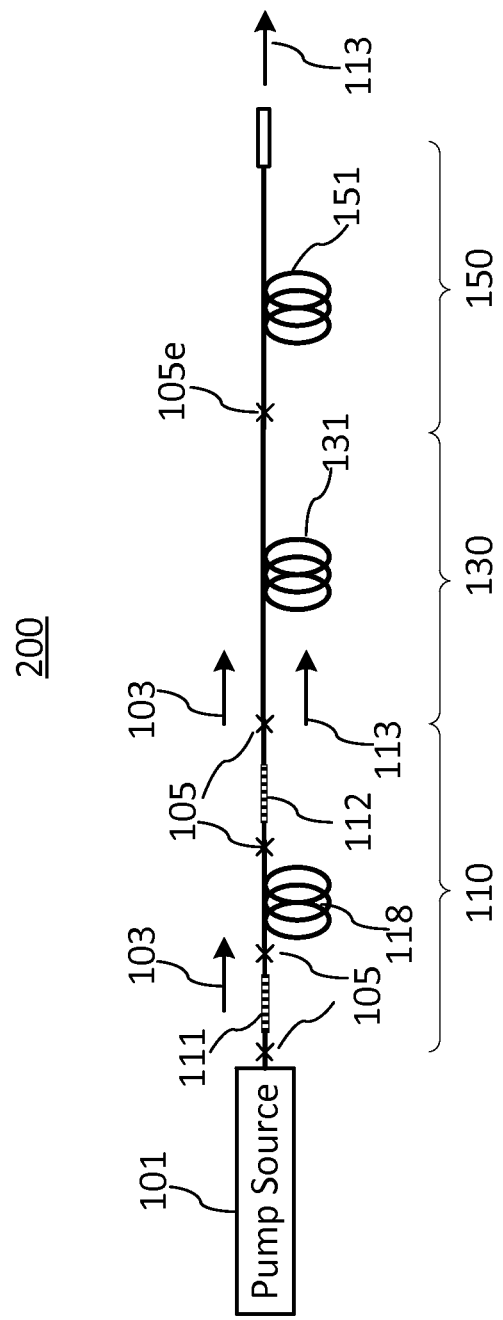
FIG. 4 is a schematic diagram of an integrated all-fiber MOPA system with a two-stage power amplifier.

With reference to FIG. 4, there is illustrated an exemplary MOPA system 200 having an additional amplifications stage 130 formed of an active cladding-pumped DCF 131, which is also referred to herein as the intermediate fiber amplifier and which is spliced between the output amplifier 150 and the master oscillator 110. Although not shown, some embodiments may include additional components spliced between the amplification stages 130 and 150, such as a tap monitor for monitoring the signal power between amplification stages 130 and 150, a mode-field adapter to couple efficiently between different core sizes in amplification stages 130 and 150 in embodiments wherein these sizes are different, or a Raman filter to suppress parasitic Raman lasing between amplification stages 130 and 150, among others. In this exemplary embodiment, inner claddings of both the master oscillator fiber 118 and of the intermediate amplifier fiber 131 have substantially circular cross-sections as illustrated in FIG. 2, while the inner cladding 20b of the amplifier fiber 151 has the non-circular cross-section as illustrated in FIG. 3. Generally, the inner cladding of each consecutive DCFs that together make up the MOPA 200 has a circular cross-section up to the last splice 105e coupling the output amplification stage 150 to the rest of the MOPA, and has the non-circular cross-section only in the last, output amplification stage 150.

Figure 5:
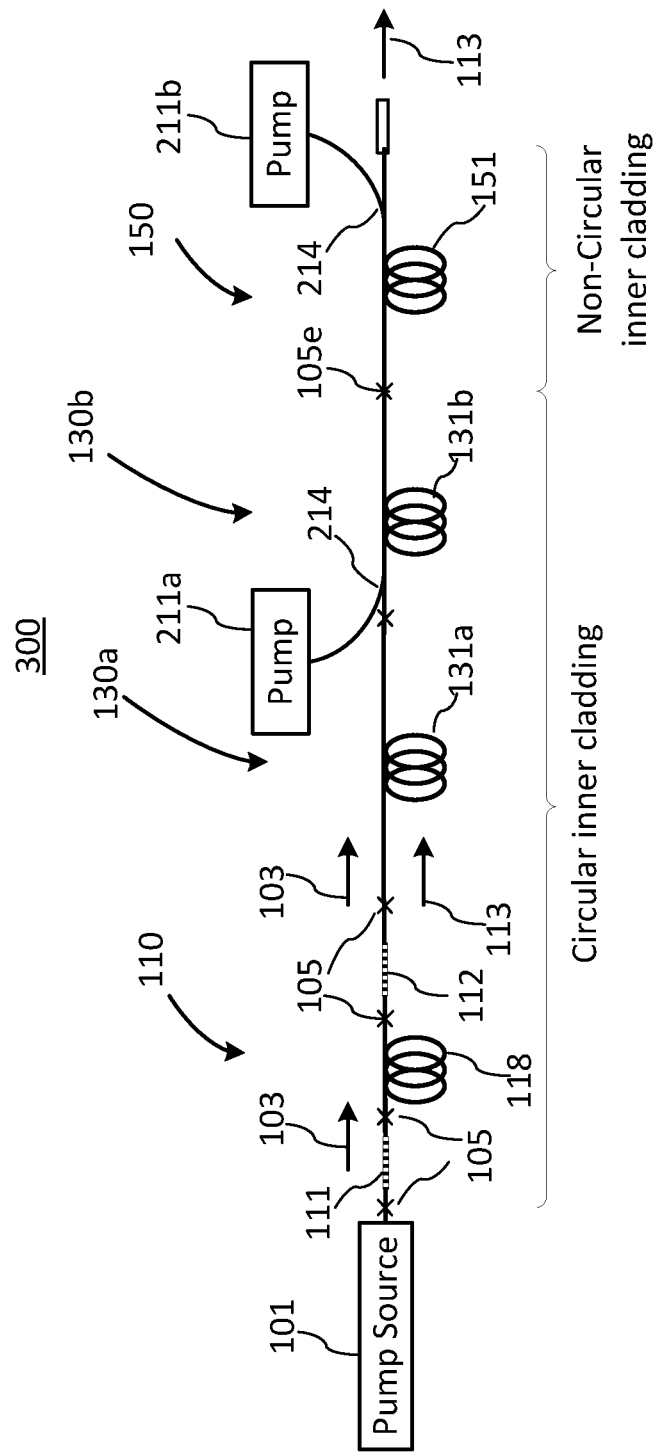
FIG. 5 is a schematic diagram of an integrated all-fiber MOPA system with a multi-stage power amplifier and additional pumps.

Other embodiments may include two or more intermediate amplification stages, with or without additional components spliced therebetween, and may further include additional pumps for pumping the amplification stages of the MOPA in co-propagating and/or counter-propagating directions. One such exemplary multi-stage MOPA system 300, having two intermediate amplifications stages 130a and 130b spliced sequentially between the output amplifier 150 and the master oscillator 110, and two additional optical pump sources 211a and 211b, is schematically illustrated in FIG. 5. In this exemplary embodiment, inner claddings of the master oscillator fiber 118 and of DCFs 131a, 131b of the intermediate amplifiers 130a,b have substantially circular cross-sections as illustrated in FIG. 2, while the inner cladding 20b of the amplifier fiber 151 of the final amplification stage 150 has the non-circular cross-section as illustrated in FIG. 3. In one embodiment, the inner cladding of each consecutive DCFs that together make up the MOPA 300 has a circular cross-section up to the last splice 105e coupling the output amplification stage 150 to the rest of the MOPA, and has the non-circular cross-section only in the last, output amplification stage 150.

Accordingly, an aspect of the present invention provides an integrated all-fiber MOPA system that includes a fiber laser oscillator 110 with two FBG reflectors 111, 112 spliced at opposite ends of a section of an amplifying optical fiber 118, an output power amplifier 150, and one or more intermediate fiber amplifiers 130 sequentially coupled in-between the fiber laser oscillator 110 and the output power amplifier 150 using fiber-optic splices 105 in the absence of mode mixers therebetween so as to form an integral fiber-optic structure. Each section of this MOPA system, including the fiber laser oscillator, the output amplifier and the one or more intermediate fiber amplifiers, is formed of a length of a double-clad optical fiber (DCF) having a core, an inner cladding, and an outer cladding. The inner cladding of the DCF has a circular cross-section in all sections of the MOPA system except for the output power amplifier 150 where the inner cladding of the DCF 20b has a shaped non-circular cross-section, in order to enhance the absorption of the pump light in a doped core of the output power amplifier while enabling the formation of low loss optical splices in the rest of the MOPA system. Because only partial pump absorption is required upstream of the final amplification stage 150, high or complete pump absorption is not required at the preceding stages, enabling the use of circular fiber everywhere in the MOPA but the very last, output amplification stage 150. Advantageously, this approach minimizes the pump and signal optical splice loss, maximize the stripping, cleaving, and splicing yield, and minimize the cost of the fibers employed in the system.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

We claim:

1. An integrated master oscillator and power amplifier (MOPA) system comprising:
    a fiber laser oscillator for emitting laser light when pumped by pump light, comprising:
        a first double clad optical fiber (DCF) comprising:
            a core doped with active ions along at least a portion thereof,
            an inner cladding surrounding the core and defining a waveguide for the laser light generated in the core, and
            an outer cladding surrounding the inner cladding and defining a waveguide for the pump light; and,
        first and second fiber Bragg grating (FBG) reflectors integrally disposed at opposite ends of the first DCF so as to define an optical cavity of the fiber laser oscillator;
    a pump source optically coupled to the first DCF for emitting the pump light into the inner cladding of the first DCF; and, a first fiber optic power amplifier comprising a second DCF having a core doped with active ions for amplifying the laser light received from the fiber laser oscillator through the second FBG reflector, an inner cladding for guiding the laser radiation, and an outer cladding for guiding the pump radiation received from the fiber laser oscillator through the second FBG reflector;

wherein:
    the first DCF of the fiber laser oscillator is optically coupled to the second DCF of the first fiber optic amplifier using one or more optical splices so as to form a monolithic fiber-optic structure, the inner cladding of the first DCF has a circular cross-section in order to enable the formation of low loss optical splices in the integrated MOPA structure; and, the inner cladding of the second double clad optical fiber has a shaped non-circular cross-section in order to enhance the absorption of the pump light in the doped core of the second DCF.

2. The MOPA system of claim 1, wherein the fiber Bragg grating reflectors are formed in undoped portions of the first double clad optical fiber so as to permit the propagation of unabsorbed pump light to the first fiber optic power amplifier.

3. The MOPA system of claim 2, wherein the second fiber Bragg grating reflector comprises a passive DCF, which is spliced between the first and second DCFs and has an inner cladding of circular cross-section that is matched in size to the inner cladding of the first DCF.

4. The MOPA of claim 1, wherein the fiber laser oscillator and the first fiber optic power amplifier are sequentially coupled with fiber splices to each other and to the pump source so as to form an integrated all-fiber structure.

5. The MOPA of claim 1, wherein the fiber laser oscillator and the first fiber optic power amplifier are sequentially coupled with fiber splices in the absence of a mode mixer therebetween.

6. The MOPA of claim 1, including one or more intermediate fiber-optic amplifiers splice-coupled between the fiber laser oscillator and the first fiber optic power amplifier, each comprising a double clad optical fiber amplifying medium having an inner cladding of a circular cross-section to enable low-loss fiber-optic splices.

7. An integrated all-fiber master oscillator power amplifier (MOPA) system comprising:
    a fiber laser oscillator comprising two fiber Bragg grating (FBG) reflectors spliced at opposite ends of a section of an amplifying optical fiber, an output power amplifier, and one or more intermediate fiber amplifiers sequentially coupled in-between the fiber laser oscillator and the output power amplifier using fiber-optic splices in the absence of mode mixers therebetween to form an integral fiber-optic structure;

wherein each section of the MOPA system, including the fiber laser oscillator, the output amplifier and the one or more intermediate fiber amplifiers, is formed of a double-clad optical fiber (DCF) having a core, an inner cladding, and an outer cladding; and, wherein the inner cladding of the DCF has a circular cross-section in all sections of the MOPA system except for the output power amplifier where the inner cladding of the DCF has a shaped non-circular cross-section, in order to enhance the absorption of the pump light in a doped core of the output power amplifier while enabling the formation of low loss optical splices in the rest of the MOPA system.

* * * * *